United States Patent Office 3,577,532
Patented May 4, 1971

3,577,532
DISINFECTED ANTACID COMPOSITIONS AND METHOD FOR THE PREPARATION THEREOF
George H. Schneller, Devon, and Ralph S. Levi, Norristown, Pa., assignors to American Home Products Corporation, New York, N.Y.
No Drawing. Filed June 30, 1967, Ser. No. 650,243
Int. Cl. A61k 27/00; A61l 13/00
U.S. Cl. 424—149
6 Claims

ABSTRACT OF THE DISCLOSURE

Pharmaceutical or cosmetic compositions especially susceptible to microbiological contamination, are disinfected by treatment with chloramines.

---

This invention relates to disinfected pharmaceutical and cosmetic compositions. More particularly it contemplates a method for disinfecting pharmaceutical and cosmetic compositions which support the growth of microorganisms, especially those pharmaceutical compositions containing gels, magmas or suspensions of antacids, or syrups, or the cosmetic compositions containing polysaccharide gum.

BACKGROUND OF THE INVENTION

It is a matter of common experience in the manufacture and storage of pharmaceutical and cosmetic compositions, especially those containing alumina gel or magnesium hydroxide gel, or for example, gum karaya, to observe a massive proliferation of microorganisms. Frequently, this surprisingly follows an indication of sterility when the goods are packaged and tested initially for the presence of bacteria, molds, yeast and the like. The said formulations are well known to present difficult problems of microbiological control during formulation because of the prolonged periods of time involved in the precipitation, washing and concentration of the gels and magmas or the preparation of syrups and gum solutions or suspensions. These conditions are highly favorable to the growth of microorganisms. Chlorine is the standard disinfecting agent employed in the industry to control bacteria, molds, yeast and the like in products of this type. The protective power of chlorine is limited, though, since the products may later lose apparent sterility if not enough chlorine is used, and if chlorine is used in concentrations required for complete positive sterility it imparts an unpleasant taste and odor to the product. At high concentrations of chlorine, it also tends to react with other ingredients such as flavorings, color substances and it may even be adsorbed by some ingredients. Furthermore, even with the higher concentrations, e.g., 30 parts per million (p.p.m.) and more, failures in bacterial control are often encountered as much as eight months after filling (and this in spite of a false indication of sterility at the time of packaging). Furthermore, it is a matter of common knowledge and experience that polysaccharide gum solutions, particularly Karaya gum solutions, support the growth of microorganisms. These are the basic ingredients in cosmetic compositions, such as hair wave sets. The growth of microorganisms in these cause them to become unacceptable and they must be discarded. Thus a clear need exists for an improved means to disinfect pharmaceutical and cosmetic compositions, especially those containing gels, magmas and suspensions, and syrups and gums without imparting an undesirable taste and odor to the composition.

It is therefore a primary obejct of the instant invention to provide disinfected pharmaceutical and cosmetic compositions.

A further object is to provide disinfected cosmetic compositions with improved shelf life.

A further object is to provide disinfected pharmaceutical or cosmetic compositions, with improved stability on long term storage, which are devoid of unpleasant taste and odor.

DESCRIPTION OF THE INVENTION

These and other objects readily apparent to those skilled in the art are easily obtained by practice of the means of the instant invention which is, in essence: a process for disinfecting a pharmaceutcal or cosmetic composition which comprises contacting the said composition with at least a microorganism-controlling amount of a chloramine of Formula I:

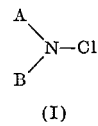

(I)

wherein A and B, independently, are hydrogen, chlorine, lower alkyl or lower hydroxylalkyl.

Special mention is made of two convenient means to carry out the above process; in one of these the chloramines are generated externally in a pharmaceutically-acceptable liquid medium by adding to said medium chlorine, an alkali metal hypochlorite or an alkaline earth metal hypochlorite and a stoichiometrically-equivalent amount of ammonia, based on available chlorine, and then the chloramine-containing medium is added to said pharmaceutical or cosmetic composition; and in the other the chloramines are generated in situ in said composition by first adding chlorine, an alkali metal hypochlorite or an alkaline earth metal hypochlorite and then a stiochiometrically-equivalent amount of ammonia, based on available chlorine. Of course as will be understood by those skilled in the art, the order of addition can be reversed, the ammonia being added first.

An important embodiment of the instant invention is a process as first above defined wherein said pharmaceutical composition is in liquid form containing an antacid gel, magma or suspension.

A further embodiment of this invention is a process as next above defined wherein said antacid is aluminum hydroxide, magnesium hydroxide, magnesium trisilicate or a mixture thereof.

The instant invention also contemplates among its embodiments a disinfected pharmaceutical or cosmetic composition prepared by contacting said composition with at least a microorganism-controlling amount of a chloramine of Formula I.

An embodiment of this invention is a pharmaceutical composition as next above defined which is an antacid.

Another embodiment of the instant invention is a pharmaceutical composition as next above defined wherein said antacid is aluminum hydroxide, magnesium hydroxide, magnesium trisilicate or a mixture thereof.

Also contemplated is a pharmaceutical composition as next above defined which consists essentially of a suspension of an antacid aluminum hydroxide gel and a demulcent aluminum hydroxide gel and chloramine. This embodiment is useful for temporary relief of gastric hyperacidity and the management of peptic ulcer.

In addition, the instant invention contemplates a pharmaceutical composition as first above defined, which includes [(3-carbamoyl-3,3-diphenylpropyl)-ethyldimethylammonium bromide] and butabarbital. This embodiment provides a combination of antacid, an anticholinergic and a sedative useful in the treatment of patients with peptic ulcer and associated conditions.

Among the embodiments contemplated by this invention is a composition as first above defined, which includes [N,N-bis-(N-methyl - N - phenyl-t-butylacetamido)-beta-hydroxyethylamine]. This embodiment provides means to treat a peptic ulcer patient with a gastric local anesthetic and an antacid.

Still another embodiment contemplated by the instant invention is a composition as first above defined, which is a hair wave set containing a polysaccharide gum. Special mention is made of a further important embodiment, which is a hair wave set as next above defined wherein said gum is Karaya gum.

When used herein and in the appended claims the term "pharmaceutical composition" broadly includes those subject to deterioration by microbiological attack, such as, for example, syrups, jellies, parenteral products, ointment, opthalmic liquids, powders, gels, magmas, suspensions and the like. "Cosmetic compositions" likewise is contemplated in its broadest sense, including, for example, liquids, suspensions, gels, jellies, ointments, and the like. Pharmaceutical compositions in tablet and capsule form also are contemplated.

When used herein and in the appended claims the term "lower alkyl" is intended to include alkyl groups, straight and branched chain, of from about 1 to about 6 carbon atoms, illustrative members of which are methyl, ethyl, n-propyl, i-propyl, n-butyl, t-butyl, n-pentyl, n-hexyl, 3-methyl pentyl and the like. The term "lower hydroxyalkyl" contemplates monohydroxyalkyl groups, straight and branched chain, of from about 1 to about 6 carbon atoms, illustrative members of which are hydroxymethyl, 2-hydroxyethyl, 2-hydroxyprop-2-yl, 3-hydroxy-n-hexyl, and the like.

Chloramines of Formula I herein include broadly compounds, both organic and inorganic, containing one or more chlorine atoms attached to nitrogen. Illustrative compounds embraced by Formula I, therefore, are the inorganic compounds $NH_2Cl$, $NHCl_2$ and $NCl_3$. The preparative chemistry of inorganic chloramines is thoroughly reviewed by R. S. Drago, J. Chem. Education, 34, 541 (1957). In addition, there are included in Formula I the organic chloramines, such as, for example, N,N-dichloromethylamine, N,N-dichloroethylamine, N,N-dichloropropylamine, N,N-dichlorohydroxymethylamine, and the like. The preparative chemistry of these compounds is discussed in "Encyclopedia of Chemical Technology," volume 3, 1949, p. 664 and in references cited therein. With respect to monochloramine, $NH_2Cl$, this colorless, unstable, pungent liquid can be prepared in a number of ways, for example, by treating chlorine with ammonia, or by reacting an alkali metal, e.g., potassium or sodium, hypochlorite or an alkaline earth metal, e.g., magnesium or calcium, hypochlorite with ammonia.

The amount of chloramines necessary to provide disinfection is contemplated to be that determined to be "microorganisms-controlling." This, of course, will depend on the type of microorganisms existing in the formulating area, and those likely to come into contact with the composition prior to and during packaging. Furthermore, not so little of chloramines are used that they will provide disinfection only during formulation (and give a "false" positive) then permit proliferation during storage. There appears to be no upper limit on the amount that can be used; even up to 500 p.p.m. and above can be used but there is no advantage in employing more than necessary to control the organisms. Taking the above factors into consideration, a microorganisms-controlling amount of chloramine will usually be from about 0.25 to about 500 parts per million by weight, based on the volume of the composition and preferably from about 5 to about 20 p.p.m., and especially about 10 p.p.m., by weight, based on the volume.

Among the liquid pharmaceutical compositions of this invention are mixtures of aqueous liquid preparations which contain suspended insoluble solid substances intended for internal use. The insoluble material should be in a very finely divided state and it is uniformly distributed during preparation by the use of colloid mills, special methods of precipitation, suspending agents and the like. The terms "gel," "magma" and "suspension" used in the appended claims are to be interpreted in their classical sense, such as outlined, for example, in standard reference works like "Remington's Practice of Pharmacy" and the "United States Pharmacopaeia." Gels, magmas and suspensions are aqueous liquid preparations containing sufficient suspended insoluble substances, usually inorganic, to make the product quite viscous, differing from mixtures (such as chalk mixture) in this respect. In many of the gels and magmas, the insoluble substance is freshly precipitated in such a manner that there is very slight sedimentation of the material on standing. This characteristic of gels and magmas is sometimes enhanced by passing the product through a colloid mill. Illustrative of the magmas, gels and suspensions improved by this invention are aluminum hydroxide gel, aluminum phosphate gel, bentonite magma, magnesia magma, bismuth magma, magnesium trisilicate, ferric hydroxide magma and the like, especially those of aluminum hydroxide and magnesium hydroxide. As mentioned above, the magmas, gels or suspensions can include other therapeutically useful substances, such as, for example, anticholinergics, like [(3-carbamoyl-3,3-dphenylpropyl)ethyldimethyl-ammonium bromide]; sedatives, such as butabarbital; gastric local anaesthetics, like [N,N-bis-(N-methyl-N-phenyl-t-butylacetamido)-beta-hydroxyethylamine], and the like, as well as flavoring ingredients or adjuvants such as oil of peppermint, glycerin, sucrose, saccharin, and the like and auxiliary preservatives, such as sodium benzoate. Magmas, gels and suspensions are prepared by methods outlined in detail in standard reference works such as, for example, "Remington's Practice of Pharmacy," ninth edition, The Mack Publishing Co., Easton, Pa. (1936).

The ability of inorganic chloramines to destroy a variety of microorganisms including bacteria and fungi was demonstrated as follows: A number of aliquots of a liquid pharmaceutical composition comprising an aqueous suspension of aluminum hydroxide gel and magnesium hydroxide magma are treated with 1 p.p.m. of chloramines then inoculated with various bacteria and molds and then incubated. The microorganisms are then counted by standard bacteriological techniques. The following results are obtained:

TABLE I

| Time | Pseudomonas aeruginosa | Staph. aureus | Aspergillus niger | Escherichia coli | Candida albicans |
|---|---|---|---|---|---|
| Initial | 14,300 | 14,000 | 22,300 | 28,000 | 20,000 |
| 1 day | 30 | 0 | 27,000 | 0 | 0 |
| 3 days | 0 | 0 | 27,000 | 0 | 0 |
| 7 days | 0 | 0 | 5 | 0 | 0 |

Thus inorganic chloramines show the ability to disinfect the composition to the point of substantial disappearance of microorganisms.

The ability of inorganic chloramines to assist the maintenance of positive sterility in comparison with chlorine was demonstrated as follows: Aliquots of an aqueous suspension of aluminum hydroxide gel and magnesium hydroxide magma are treated respectively with 8 p.p.m. of chlorine and with 8 p.p.m. of chlorine treated with the stoichiometric quantity of ammonia needed to form chloramine. (The treatment of 0.75 part of chlorine with ammonia provides 1 part of chloramine.) The compositions are inoculated immediately with a strain of Pseudomonas (known to occur as a contaminant) then other portions are challenged one week later and the results are summarized in Table II:

TABLE II

| Disinfectant | A—Challenged immediately after treatment | | B—Challenged one week after treatment | | | |
| --- | --- | --- | --- | --- | --- | --- |
| | Immediate bacterial count | Bacterial count 30 min. after challenge | Immediate bacterial count | Bacterial count 30 min. later | Bacterial count 1 day later | Bacterial count 3 days later |
| Chlorine | 18,000 | 0 | 14,200 | 16,300 | 29,300 | 22,700 |
| Chloramine | 18,000 | 0 | 14,200 | 100 | 0 | 0 |

Whereas both preparations originally destroyed the challenging bacteria, the chlorine-disinfected preparation was ineffective to overcome a challenge one week later. In contrast, chloramine readily overcame such a challenge. This difference in behavior provides substantial practical advantages, because following the compounding of a batch of pharmaceutical or cosmetic composition, a week or longer may easily pass before the bulk liquid has been homogenized or otherwise physically processed, assayed for various ingredients, checked for sterility and filled into market packages—the filling step alone may consume a number of days. An agent, like chlorine, which may destroy bacteria initially, but is not able to protect the product during subsequent processing and holding steps, right up to filling the last package, falls far short of an ideal.

In still another demonstration of the efficacy of the instant process an aqueous suspension of aluminum hydroxide gel and magnesium hydroxide magma with added sweeteners, thickeners, sodium benzoate, anticaking agents and oxethazaine could not be protected with 6 p.p.m. of chlorine against a bacteria challenge similar to that next above described. When challenged immediately after chlorine treatment, a bacterial count one day after challenge disclosed "apparent" sterility, but this was "false" as shown by counts performed after 5 and 7 days which disclosed bacteria too numerous to count, i.e., over 1000 per ml. Furthermore, after the preparation had been allowed to stand for 1 week following the chlorine treatment, and was then challenged by inoculation with the test bacteria, an agar plate count performed on the 1st, 5th and 7th day after challenge failed to disclose the presence of bacteria but by the 30th day after challenge, bacteria had multiplied to a number too large to count. In sharp contrast, chloramine had killed all bacteria one day after challenge, and the preparation remained sterile, both in the initial challenge immediately following treatment, and in the challenge one week after the treatment.

Another product which tends to support the growth of microorganisms is a hair wave set containing a polysaccharide gum. A Karaya gum solution, for example, is an excellent supporting medium. Chloramines added at 7 p.p.m. produced a reduction in colony count from 3,000 to 1,500 (in known contaminated samples) in 4 hours in one batch; 3,000 to 1,500 in 48 hours in another batch; and 3,000 to zero in another lot. Controls were run with each sample. At the 14 p.p.m. level, however, there was a consistent elimination of all colonies in 4 hours.

The results obtained in the instant invention are surprising in view of the past acceptance of chlorine as a disinfectant and the well-established feeling that chloramines are considered to be inferior to chlorine in the treatment of water. The tendency for chlorine to react and/or be adsorbed, and the effective amount thereof to be reduced thereby, has been mentioned above; with chloramines this tendency (to react with other ingredients) is much reduced or absent.

DESCRIPTION OF THE PREFERRED EMBODIMENTS

The following examples are given by way of illustration and are not to be construed as limitations of this invention, variations of which are possible without departing from the spirit or scope thereof.

EXAMPLE 1

An aluminum hydroxide gel is prepared as follows: Dissolve 35 oz. of sodium carbonate in 1 gal. of hot water and filter. Dissolve 28 oz. of ammonium alum in ½ gal. of hot water and filter into the carbonate solution with constant stirring. Then add 1 gal. of hot water and remove all gas. Dilute to 20 gal. with cold water. Collect and wash the precipitate and suspend it in ½ gal. of distilled water flavored with 0.01 percent peppermint oil and preserved with 0.1 percent of sodium benzoate.

A disinfected composition according to this invention is made by adding 10 p.p.m. by weight per part by volume of chloramine to a gel prepared as described.

A disinfected composition according to this invention is made by adding 7.5 p.p.m. by weight per part by volume of chlorine to a gel prepared as described then adding the stoichiometrically-equivalent amount of ammonia, based on available chlorine; this provides the equivalent of 10 p.p.m. of inorganic chloramines, generated in situ.

A disinfected composition according to this invention is made by adding sodium hypochlorite in an amount calculated to provide 7.5 p.p.m. by weight per part by volume of available chlorine to a gel prepared as described then adding the stoichiometrically-equivalent amount of ammonia, based on the available chlorine.

A disinfected composition according to this invention is made by adding calcium hypochlorite in an amount calculated to provide 7.5 p.p.m. by weight per part by volume of available chlorine to a gel prepared as described then adding the stoichiometrically-equivalent amount of ammonia, based on the available chlorine.

EXAMPLE 2

A magma of magnesium hydroxide (magnesia magma) is prepared as follows: Dissolve 300 g. of magnesium sulfate in sufficient distilled water to make 650 ml., place this in a vessel of about 5000 cc. capacity, and heat to boiling. Dissolve 100 g. of sodium hydroxide in sufficient distilled water to make 1000 ml., add this slowly to the boiling solution of magnesium sulfate and continue the boiling for thirty minutes. Transfer the mixture to a cylindrical container of not less than 5000 ml. capacity and fill with hot distilled water. Allow to stand until separation has occurred, and remove the supernatant liquid. Wash repeatedly with hot distilled water until sulfate ions have practically been eliminated as shown by testing the supernatant liquid with barium chloride. Concentrate the mixture by evaporation until it contains not less than 7 percent of magnesium hydroxide.

A disinfected composition according to this invention is prepared by adding 5.25 p.p.m. by weight per part by volume of chlorine, to the magma prepared as described, then adding the stoichiometrically-equivalent amount of ammonia, based on available chlorine; this provides the equivalent of 7.0 p.p.m. of inorganic chloramines, generated in situ.

A disinfected composition according to this invention is prepared by adding 14 p.p.m. by weight per part by volume of chlorine to the magma prepared as described, then adding the stoichiometrically-equivalent amount of ammonia, based on available chlorine; this provides the equivalent of 20 p.p.m. of inorganic chloramines, generated in situ.

EXAMPLE 3

A pharmaceutical composition is prepared by mixing an antacid aluminum hydroxide gel and a demulcent aluminum hydroxide gel. This is disinfected by adding 10 p.p.m. by weight per part by volume of chloramine. The chloramine is prepared externally in an appropriate concentration in an aliquot of distilled water by adding chlorine to the aliquot and then the stoichiometrically-equivalent amount of ammonia. The chloramine-containing aliquot then is added to the composition.

EXAMPLE 4

A composition is prepared, which contains in each 5 cc., the equivalent of 1 teaspoonful of aluminum hydroxide gel and ¼ teaspoonful of magnesia magma. This pharmaceutical composition is disinfected by adding 10 p.p.m. by weight per part by volume of chloramine.

EXAMPLE 5

A composition is prepared, which contains in each 5 cc., 2.5 mg. of [(3-carbamoyl-3,3-diphenylpropyl)ethyl-dimethylammonium bromide], 8 mg. of butabarbital, the equivalent of 1 teaspoonful of aluminum hydroxide gel and ¼ teaspoonful of magnesium hydroxide magma. This is disinfected by adding 10 p.p.m. by weight per part by volume of chloramine.

EXAMPLE 6

A composition is prepared, which contains in each 5 cc., 10 mg. of [N,N-bis(N-methyl-N-phenyl-t-butylacetamido)-beta-hydroxyethylamine], the equivalent of 1 teaspoonful of aluminum hydroxide gel and ¼ teaspoonful of magnesium hydroxide magma. This is disinfected by adding 10 p.p.m. by weight per part by volume of chloramine.

EXAMPLE 7

A syrup is prepared by formulating glucose and distilled water by the procedure in "Remington's Practice of Pharmacy," ninth edition, p. 235. This is compounded into a non-narcotic cough medicine wherein each 5 cc. teaspoonful contains 7.5 mg. dextromethrophan hydrobromide; 5.0 mg. promethazine hydrochloride; 0.17 min. fluidextract ipecac; 44 mg. potassium guaiacolsulfonate; 0.25 min. chloroform; 60 mg. citric acid, anhydrous; and 197 mg. sodium citrate, the balance being syrup and alcohol 7% by volume. This pharmaceutical composition is disinfected by adding, respectively, 0.25, 1, 5, 10, 20, 50, 100, 200, 400 and 500 p.p.m. by weight per part by volume of chloramines.

EXAMPLE 8

A wave set (hair-waving) fluid is formulated as follows:

100 grade citrus pectin—3.5 g.
Powdered gum karaya—28 g.
Anhydrous ethyl alcohol—1 fl. oz.
Salicyclic acid—0.5 g.

Thoroughly mix the pectin, gum karaya and salicylic acid. Add the alcohol to the dry ingredients, stirring thoroughly to obtain a good suspension. (Only the salicyclic acid will dissolve in the alcohol.) Pack in a 2-fluid ounce bottle. Shake the bottle thoroughly until the contents are uniform. Add the entire contents of the bottle to 16 fluid ounces of hot (almost boiling) water. Allow to stand until the gum karaya and pectin are completely dissolved.

This cosmetic composition is disinfected by adding, during formulation, 7 p.p.m. and 14 p.p.m. by weight per part by volume of inorganic chloramines.

EXAMPLE 9

An aqueous aluminum hydroxide gel, prepared as described in Example 1, is disinfected by treating portions respectively with 10 p.p.m. by weight, based on the volume of composition, of chloramines of the formula:

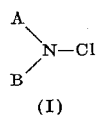
(I)

| A: | B: |
|---|---|
| H | H |
| Cl | H |
| Cl | Cl |
| CH₃ | CH₃ |
| CH₃CH₂ | CH₃CH₂ |
| CH₃ | Cl |
| CH₃CH₂ | Cl |
| CH₃CH₂CH₂ | Cl |
| HOCH₂ | HOCH₂ |
| HOCH₂ | Cl |

What is claimed is:

1. A process for the disinfection of compositions selected from the group of antacid pharmaceutical gels, magmas and suspensions, containing antacids selected from the group consisting of aluminum hydroxide, magnesium hydroxide, magnesium trisilicate and mixtures therefore, and which contain or are capable of supporting the growth of microorganisms selected from the group consisting of bacteria, molds and yeasts; which comprises contacting said compositions with at least a microorganism-controlling amount of from about 0.25 up to about 500 parts per million w./v. of a chloramine of the formula:

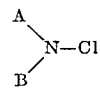

wherein A and B are independently selected from the group consisting of hydrogen, chlorine, lower alkyl and lower hydroxyalkyl.

2. A process as in claim 1 wherein said contacting is effected by the generation of the chloramine in situ in the composition being disinfected by adding to the composition:
  (1) a member selected from the group consisting of chlorine, an alkali metal hypochlorite, and an alkaline earth metal hypochlorite; and
  (2) a stoichiometrically-equivalent amount of ammonia, based on the amount of available chlorine provided by (1).

3. A process as in claim 1 wherein said antacid containing composition contains (3-carbamoyl-3,3-diphenylpropyl)-ethyldimethylammonium bromide and butabarbital.

4. A process as in claim 1 wherein said antacid containing composition contains N,N-bis-(N-methyl-N-phenyl-t-butylacetamido)-β-hydroxyethylamine.

5. A process as in claim 1 wherein said antacid containing composition consists essentially of a suspension of an antacid aluminum hydroxide gel and a demulcent aluminum hydroxide gel.

6. The product produced by the process of claim 1.

References Cited

UNITED STATES PATENTS 1,940,592  12/1933  Henderson _____ 23—190
2,379,335   6/1945  Baker _____ 83—28

(Other references on following page)

OTHER REFERENCES

The Merck Index, 1960, p. 629.

Martin et al.: Remington's Pharmaceutical Sciences, 1965, p. 1379.

Physicians' Desk Reference, 1962, pp. 925, 926, 929, 930.

De Navarre et al.: The Chemistry and Manufacture of Cosmetics, 1941, p. 443.

Kirk-Othmer: Encyclopedia of Chem. Technology, 1964, vol. 2, pp. 615, 616, vol 4, pp. 908–928.

SAM ROSEN, Primary Examiner

A. J. ROBINSON, Assistant Examiner

U.S. Cl. X.R.

424—155, 158, 166, 254, 325, 329